Oct. 29, 1963 D. A. KRAMER 3,109,061
NOISE CUT-OFF OF AGC AND SYNC-SEPARATOR TUBES
Filed Aug. 10, 1960
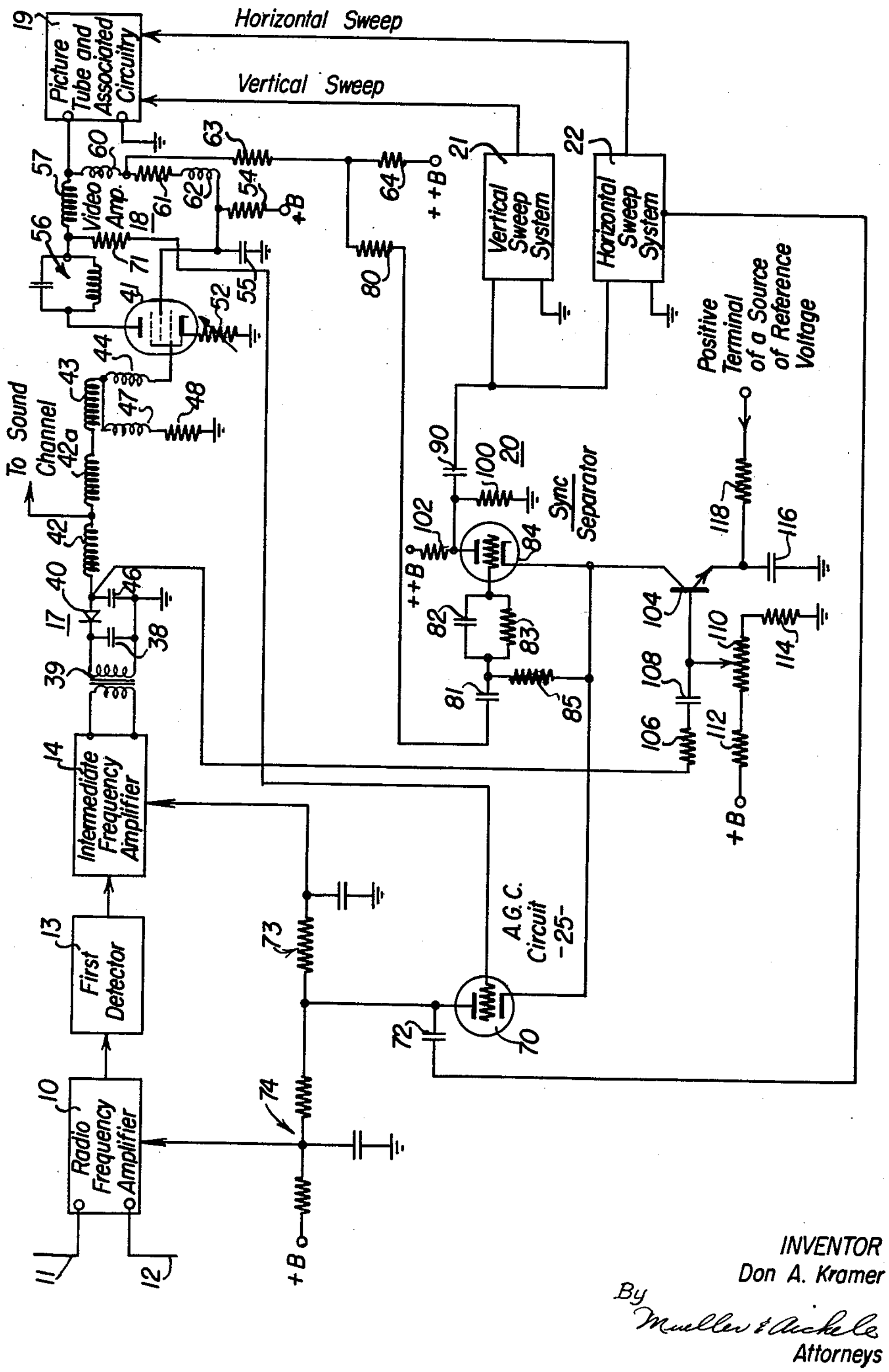
INVENTOR
Don A. Kramer
By Mueller & Aichele
Attorneys

United States Patent Office 3,109,061

Patented Oct. 29, 1963

3,109,061

NOISE CUT-OFF OF AGC AND SYNC-SEPARATOR TUBES

Don A. Kramer, Minneapolis, Minn., assignor to Motorola, Inc., Chicago, Ill., a corporation of Illinois Filed Aug. 10, 1960, Ser. No. 48,747
1 Claim. (Cl. 178—7.3)

The present invention is directed generally to television receivers, and it more particularly relates to an improved type of television receiver which is constructed so that the synchronizing signal separator and automatic gain control circuits therein are not subject to paralysis by high level noise disturbances which are sometimes received concomitantly with a received television signal.

Present-day television signals are standardized to include video signal components occurring in successive trace intervals and to include synchronizing signal components which occur during interposed retrace intervals. The synchronizing signals are pedestalled on corresponding blanking pulses, and these blanking pulses serve to extend the peaks of the synchronizing signals into a region above the maximum amplitude peaks of the video signals.

A synchronizing signal separator, which is essentially an amplitude clipper, is usually included in present day television receivers for separating the synchronizing signal components from the remainder of the received and detected television signal. This synchronizing signal separator usually includes an electron discharge device which is biased to clip the high amplitude synchronizing signal components from the detected television signal, and to introduce the separated synchronizing signal components to the horizontal and vertical sweep systems of the television receiver to synchronize the sweep systems with the received television signal.

It is also usual to incorporate an automatic gain control circuit in the television receiver to control the gain of the receiver in the presence of received television signals of different amplitude levels. The detected television signal in the receiver is introduced to the automatic gain control circuit in order that an automatic gain control signal may be formed. This automatic gain control signal usually has an amplitude related to the peak amplitude of the synchronizing signal components of the received television signal, and it is used to control the gain of the stages of the television receiver in accordance with well established techniques and practices.

The input circuit of the synchronizing signal separator of most present-day television receivers is usually constructed in a manner to respond to the peaks of the synchronizing signal components of the received television signal. This response renders the synchronizing signal separator discharge device self-biasing to some extent, so that the device will clip the synchronizing signal components at an essentially fixed level within the television signal despite slight variations in the intensity of the different television signals received by the television receiver. This type of synchronizing signal separator makes use of a time constant network in its input circuit which includes a series coupling capacitor, and difficulties have been encountered in the past in overcoming the adverse effects of the received noise bursts on the synchronization of the television receiver due to the paralysis of the time constant network by such bursts.

The detected television signal forms a composite video signal in the receiver, and the composite video signal is applied to the self-biasing input circuit of the synchronizing separator. The composite video signal is so applied with the synchrronizing signal components thereof having a positive-going polarity. This enables self-biasing of the electron discharge device in the synchronizing signal separator due to grid leak action to be achieved. The received noise bursts, however, also have positive-going polarity in the composite video signal applied to the input circuit of the synchronizing signal separator. Therefore, any noise bursts having material energy content cause excessive grid current to flow in the synchronizing signal separator discharge device, and thereby excessively charge the series capacitor in the time constant network in the input circuit. Subsequent discharge of this capacitor biases the synchronizing signal separator discharge device to a non-conductive state, and this action paralyzes the synchronizing signal separator for an excessively long time interval as determined by the time constant of the network in the input circuit. In many instances, this time interval is sufficiently long so that synchronization between the receiver and the received television signal is lost.

The above described action causes synchronization of the television receiver to be lost until the coupling capacitor regains its normal charge condition, because no synchronizing signals can be passed by the synchronizing signal separator to the sweep systems of the receiver during the paralzed interval. Since the input circuit of the synchronizing signal separator must have a certain minimum time constant in order that the proper self-biasing action may be maintained in response to the peaks of the synchronizing signal components of the composite video signal, it is not possible to reduce the time constant of the input circuit sufficiently to obviate the paralyzing action of the received noise bursts.

Certain attempts have been made in the prior art to provide further electron discharge devices which respond to the noise bursts to disable the synchronizing signal separator for the duration of each of noise bursts in the composite video signal applied to the synchronizing signal separator. However, these prior art attempts have not been completely successful due to the difficulties encountered from the inherent characteristics of the discharge tubes. In many instances, for example, the internal resistance of the tubes produces degenerative effects in the synchronizing signal separator stages to render such arrangements inoperative for all practical purposes.

It is, therefore, an important object of the present invention to provide an improved television receiver which is constructed to incorporate an improved circuit for rendering the synchronizing signal separator of the receiver relatively immune to paralysis with a resulting loss of synchronization upon the receipt of high amplitude noise disturbances, and to achieve this by the means of new and improved circuitry which is not subject to the disadvantages inherent in the prior art circuits of this general type.

A more general object of the invention is to provide such an improved television receiver which is constructed to incorporate an improved circuit which may be used in conjunction with selected stages of the receiver to prevent such stages from suffering from the adverse effects of noise disturbances in the received television signal.

Another object of the invention is to provide such an improved television receiver in which improved circuitry is incorporated for freeing the synchronizing signal separator from the paralyzing effects of received noise disturbances, and which also serves to render the automatic gain control circuit of the receiver immune from the paralyzing effects of such noise bursts.

A feature of the invention is the provision of a transistor in circuit with the synchronizing signal separator discharge device of a television receiver and also, if so desired, in circuit with the automatic gain control circuit discharge device of the television receiver; and of applying a received detected television signal to the transistor for cancellation of noise bursts therein in the synchronizing signal separator and automatic gain control circuits, when such noise disturbances have an amplitude exceeding the peak amplitude of the synchronizing signal components of the received detected television signal, the transistor functioning as a switch and exhibiting an extremely low impedance when in its conducting state for normal operation so that it does not produce any material degenerative effect in the synchronizing signal separator discharge device, or on the automatic gain control circuit discharge device.

Another feature of the invention is the provision of such a noise cancellation transistorized control circuit in which feedback occurs between the collector and base circuits of the transistor which tends to aid in the noise cancellation action of the control circuit.

The above and other features of the invention which are believed to be new are specifically set forth in the claim. The invention itself, however, together with further objects and advantages thereof, may best be understood by reference to the accompanying drawing in which the single FIGURE is a circuit diagram of a television receiver incorporating one embodiment of the invention.

The television receiver illustrated in the accompanying drawing includes a radio frequency amplifier 10 having input terminals connected to a suitable antenna 11, 12, and having output terminals coupled to a first detector 13 which, in turn, is coupled to an intermediate frequency amplifier 14. The intermediate frequency amplifier may have any number of stages connected and coupled together in a manner well understood to the art.

The intermediate frequency amplifier 14 is coupled to a second detector 17 which, in turn, is coupled to a video amplifier 18. The video amplifier 18 is coupled to the input electrodes of a cathode ray picture tube, the picture tube and its associated sweep windings and input and control circuitry being represented by the block 19. The video amplifier 18 is also coupled to a synchronizing signal separator 20. the synchronizing signal separator being coupled to a vertical sweep system 21 and to a horizontal sweep system 22. The output terminals of the sweep systems 21 and 22 are connected respectively to the vertical and horizontal sweep windings included in the block 19. The receiver also includes an automatic gain control (AGC) circuit 25 which responds to the detected composite video signal in the output circuit of the video amplifier 18 to control the gain of the radio frequency amplifier 10 and of the intermediate frequency amplifier 14.

The receiver may be tuned so that the radio frequency amplifier 10 amplifies a television signal intercepted by the antenna 11, 12. The amplified television signal is heterodyned in the first detector 13 to the selected intermediate frequency of the telvision rceiver. The resulting intermediate frequency signal is amplified in the intermediate frequency amplifier 14, and it is detected in the second detector 17. The second detector 17 produces a composite video signal in response to the received television signal, and the synchronizing signal components of the composite video signal extend in the negative-going direction. The composite video signal produced by the second detector 17 is amplified in the video amplifier 18 and applied to the picture tube 19. The amplified composite video signal controls the intensity of the cathode ray beam in the picture tube 19 in accordance with the image intelligence of the received television signal.

The synchronizing signal components of the composite video signal produced by the second detector 17 are separated from the composite video signal by the synchronizing signal separator 20. and these synchronizing signal components are applied to the sweep systems 21 and 22 to synchronize the operation of the sweep systems and, therefore, the deflection of the cathode ray beam in the picture tube 19. In this manner, the picture tube is enabled to create an image corresponding to the intelligence contained in the received telvision signal.

A coupling transformer 39 serves to couple the intermediate frequency amplifier 14 to the circuit of the second detector 17. The secondary winding of the transformer 39 has one side connected to ground, and its other side is connected to the cathode of a diode 40. The anode of the diode 40 is directly coupled to the control grid of a pentode 41 through a direct current path including a series of choke coils 42, **42*a*, 43 and 44. The pentode 41 is included in the video amplifier 18. The secondary winding of the transformer 39 is tuned to the selected intermediate frequency of the receiver by a capacitor 38 connected across the winding, and the anode of the diode 40 is by-passed to ground for the intermediate frequencies by a capacitor 46. The junction of the choke coils 42 and 42*a* is connected to the sound channel of the receiver. Since the sound channel forms no part of the present invention, it is not shown. The junction of the choke coils 43 and 44 is connected to ground through a shunt peaking coil 47 and through a load resistor 48**.

The circuit of the pentode 41, as mentioned above, constitutes the video amplifier 18 of the television receiver. The cathode of the pentode is connected to the suppressor electrode of the pentode, and these electrodes are connected to ground through a variable resistor contrast control 52. The screen electrode of the pentode 41 is connected to the positive terminal B+ of a source of unidirectional potential through a resistor 54, and the screen electrode is by-passed to ground by a capacitor 55. The anode of the pentode 41 is connected to the picture tube 19 through a parallel resonant sound trap 56, and through a series peaking coil 57. The coil 57 is connected to the junction of the resistor 54 and capacitor 55 through a peaking coil 60, a resistor 61 and a peaking coil 62. The common junction of the coil 60 and the resistor 61 is connected through a pair of resistors 63 and 64 to the positive terminal B++ of a source of positive potential higher than the potential at the terminal B+.

The automatic gain control circuit 25 is of the gated and selective amplitude delayed type. This circuit includes a triode type of electron discharge device 70. The control grid of the automatic gain control electron discharge device 70 is connected through a resistor 71 to the junction of the sound trap 56 and peaking coil 57 in the output circuit of the video amplifier 18. The anode of the triode 70 receives gating pulses through a capacitor 72 from the horizontal sweep system 22. These pulses occur during successive line retrace intervals, so that the triode 70 is activated in time coincidence with the horizontal synchronizing pulses of the composite video signal appearing in the output circuit of the video amplifier 18. This composite video signal is introduced to the control grid of the triode 70 through the resistor 71, and the horizontal synchronizing pulse components causes a current flow through the discharge device 70 of an amplitude corresponding to the peak amplitude of the pulses. This type of gated automatic gain control circuit is well known to the art, and will not be described in full detail herein.

The use of gated automatic gain control assures that the amplitude of the horizontal synchronizing pulses in the video amplifier 18 will be held essentially constant in the presence of changes in the amplitude of the composite video signal, or of the tendency for such changes to occur. A usual filter 73 in the output circuit of the triode 70 causes a negative gain control signal to be applied to the intermediate frequency amplifier 14, and a usual network 74 in a second output circuit of the triode 70 causes an amplitude delayed automatic gain control potential to be introduced to the radio frequency amplifier 10. This arrangement provides a selective automatic gain control, with the gain of the intermediate frequency amplifier being controlled in the presence of medium strength signals, and the gain of the intermediate frequency amplifier and the radio frequency amplifier both being controlled in the presence of strong signals so as to prevent overloading.

The video amplifier 18 is coupled to the synchronizing signal separator 20 by a circuit extending from the common junction of the resistors 63 and 64 through a resistor 80 and a capacitor 81 to the common junction of a capacitor 82 and a resistor 83. The capacitor 82 is connected in shunt with the resistor 83, and these elements are connected to the control grid of an amplitude clipper electron discharge device 84, of the triode type, included in the synchronizing signal separator 20. Resistor 85 is connected from capacitor 81 to the cathode for discharging this capacitor. The triode electron discharge device 70 and the electron discharge device 84 may be included in a common envelope of the double triode type. The triode 84 of the synchronizing signal separator 20 has an anode coupled through a capacitor 90 to the vertical sweep system 21 and to the horizontal sweep system 22, so that the synchronizing signals separated from the composite video signals may be supplied to the sweep systems. The anode of the triode 84 is also connected to a grounded resistor 100 which may have a resistance, for example, of 560 kilo-ohms, and the anode is further connected to a resistor 102 which may have, for example, a resistance of 100 kilo-ohms. The resistor 102 is connected to the positive terminal B++ of a source of unidirectional potential. This potential may, for example, be of the order of 350 volts, and it may be derived from a usual bootstrap circuit in the horizontal sweep system 22.

A transistor 104 has its collector electrode connected to the cathode of the triode 70 in the automatic gain control circuit 25 and to the cathode of a triode 84 in the synchronizing signal separator 20. The illustrated transistor is of the NPN type, and it may be of the type presently designated 2N168A. The composite video signal produced by the detector 17 in response to a received television signal is introduced to the circuit of the transistor 104 through a resistor 106 and a coupling capacitor 108. The resistor 106 may have a resistance, for example, of 3.9 kilo-ohms, and it is connected to the anode of the diode 40. The capacitor 108 may have a capacity, for example, of .02 microfarad, and the capacitor is connected to the resistor and to the base electrode of the transistor 104.

The base electrode of the transistor 104 is also connected to the movable arm of a potentiometer 110. The potentiometer may have a resistance of 5 kilo-ohms, for example, and it is connected to a resistor 112 and to a grounded resistor 114. The resistor 112 may have a resistance of 5 kilo-ohms, for example, and it is connected to the positive terminal B+. This positive terminal may have a potential, for example, of 260 volts. The grounded resistor 114 may have a resistance, for example, of 4.7 kilo-ohms.

The emitter electrode of the transistor 104 is connected to a grounded capacitor 116 and to a resistor 118. The capacitor 116 may have a capacity of 0.1 microfarad, for example, and the resistor 118 may have a resistance of 4.7 kilo-ohms. The resistor 118 is connected to the positive terminal of a source of reference voltage.

As mentioned above, the second detector 17 produces a composite video signal in response to a received television signal which is detected by the detector. This composite video signal has video signal components which extend in the negative polarity direction, and it also has synchronizing signal components which, likewise, extend in the negative polarity direction. The peak amplitude of the synchronizing signal components exceeds that of the video components. This detected composite video signal is introduced to the base electrode of the transistor 104. The video amplifier 18 amplifies and inverts the composite video signal from the second detector 17. The composite video signal appearing in the output circuit of the video amplifier, therefore, has its video signal and synchronizing signal components extending in the positive-going direction. This composite video signal is introduced to the control grid of the synchronizing signal separator through the network including the capacitors 81, 82 and the resistor 83. This network constitutes a self-biasing network for the discharge device 84, and it responds to the peaks of the synchronizing signal components to establish a particular bias on the discharge device. This causes the discharge device to clip the synchronizing signal components from the composite video signal. This clipping occurs at an essentially fixed point in the composite video signal, and regardless of slight variations in the intensity of the composite video signal. However, in the absence of the improved circuitry of the invention, when the noise burst is received, and when that noise burst has material energy content and its peak amplitude exceeds that of the synchronizing signal components, the resulting excessive grid bias produced in the discharge device 84 causes the capacitors 81 and 82 to become excessively charged. The resulting discharge of these capacitors in the absence of the improved circuitry of the invention biases the device 84 to a non-conductive paralyzed state for an excessively long time interval, and this interval persists until the charge on the capacitors 81 and 82 regains its normal value. During the paralyzed interval, synchronization is lost with the received television signal.

In the improved circuit of the present invention, however, the composite video signal is also introduced to the base of the transistor 104, but with the synchronizing signal components thereof and any associated noise signal bursts therein extending in the negative-going direction. The potentiometer 110, and the value of the source of reference voltage is so chosen that the transistor 104 is conductive in the presence of the composite video signal but in the absence of noise bursts having an amplitude exceeding the peak amplitude of the synchronizing signal components. However, when such a noise burst is received, the transistor 104 is driven to its non-conductive state, and this breaks the return circuit path of the discharge device 84 in the synchronizing signal separator 20 and of the discharge device 70 in the automatic gain control circuit 25. This causes both the circuits to become disabled in the presence of such noise bursts, but only for the interval during which the actual noise bursts persist. This obviates the charging effect of the noise bursts on the capacitors in the circuits, and overcomes any prolonged time interval of paralysis of the circuits.

The transistor 104 functions, therefore, as a switch in the return circuit path of the triodes 70 and 84. When the transistor is in its normally conductive state, it exhibits an extremely low impedance, so that no undesired degenerative effects are produced in the cathode circuit of the triodes 70 and 84. The transistor is biased, as noted aobve, normally to be conductive. However, the occurrence of a noise burst of excessive amplitude renders the transistor 104 non-conductive for the reasons described above.

There is definite feedback between the collector and base circuits of the transistor 104, and this feedback tends to aid the noise cancellation action. The base-to-emitter bias of the transistor 104 is held approximately at .3 volt, for best results. The forward bias between the base and emitter of the transistor 104 is held as small as possible, while keeping the collector-to-emitter impedance low. Under these conditions, the maximum suppression of noise occurs.

An NPN transistor is required in the illustrated circuit, because signal inversion is necessary. However, the video composite signal introduced to the base of the transistor 104 may also be taken from the output circuit of the video amplifier 18, and then a PNP transistor would be used to avoid signal inversion.

The transistor 104 controls both the synchronizing signal separator 20 and the automatic gain control circuit 25. It is used as a variable impedance in the common cathode circuit of the discharge tubes forming the synchronizing signal separator and the automatic gain control circuit, as explained above. It is desirable for the transistor 104 to be of the high beta type to prevent loading of the video detector by the circuit between the second detector 17 and the base of the transistor.

The invention provides, therefore, an improved construction for a television receiver which includes a transistorized control circuit. The control circuit of the invention provides noise cancellation in certain stages of the receiver, such as in the synchronizing signal separator and in the automatic gain control circuit. The use of the improved noise cancellation circuit overcomes the deleterious effect of noise bursts on the receiver, due to the excessive capacitor charging produced by such bursts in the receiver.

What is claimed is:

In a television receiver for utilizing a television signal including video signal components and synchronizing signal components having an amplitude exceeding the peak amplitude of the video signal components, and which may include noise signal bursts having an amplitude exceeding the peak amplitude of the synchronizing signal components, the combination of: first circuit means including a detector and a video amplifier for receiving, detecting and amplifying the television signal, a synchronizing signal separator circuit including a first vacuum tube electrode discharge device, said first discharge device having a first cathode, a first grid and a first anode, first utilization circuit means coupled to said first anode, means connecting said first grid to said first circuit means for applying the television signal to said first discharge device, automatic gain control circuit means including a second vacuum tube electron discharge device, said second discharge device having a second cathode, a second grid and a second anode, second utilization circuit means coupled to said second anode, means connecting said second grid to said first circuit means for applying the television signal to said second discharge device, a transistor direct current connected from said first and second cathodes to a reference point and forming the sole direct current path for said discharge devices, further circuit means connected to said transistor and to said first circuit means to apply the television signal to said transistor and to bias the same to open circuit the current conduction paths for said cathodes in response to the noise signal bursts, said further circuit means including a variable potentiometer for adjusting the bias on said transistor.

References Cited in the file of this patent

UNITED STATES PATENTS

| | | |
|---|---|---|
| 2,736,769 | Macovski | Feb. 28, 1956 |
| 2,880,271 | Kroger | Mar. 31, 1959 |